(12) United States Patent
Kashima et al.

(10) Patent No.: US 9,810,094 B2
(45) Date of Patent: Nov. 7, 2017

(54) STEAM TURBINE FORCED AIR COOLING SYSTEM, EQUIPMENT, AND STEAM TURBINE EQUIPPED WITH IT

(71) Applicant: Mitsubishi Hitachi Power Systems, Ltd., Yokohama, Kanagawa (JP)

(72) Inventors: Genki Kashima, Yokohama (JP); Toyohiko Masuda, Yokohama (JP); Tetsuya Hinuma, Yokohama (JP); Isao Sagawa, Yokohama (JP); Yoshitaka Narimatsu, Yokohama (JP); Hotaka Kobayashi, Yokohama (JP); Goingwon Lee, Yokohama (JP); Kenji Sasaki, Yokohama (JP)

(73) Assignee: Mitsubishi Hitachi Power Systems, Ltd., Yokohama (JP)

(*) Notice: Subject to any disclaimer, the term of this patent is extended or adjusted under 35 U.S.C. 154(b) by 346 days.

(21) Appl. No.: 14/533,537

(22) Filed: Nov. 5, 2014

(65) Prior Publication Data

US 2015/0125260 A1    May 7, 2015

(30) Foreign Application Priority Data

Nov. 6, 2013 (JP) ................. 2013-230192

(51) Int. Cl.
*F01D 25/12* (2006.01)
*F01K 5/02* (2006.01)
(Continued)

(52) U.S. Cl.
CPC ............. *F01D 25/12* (2013.01); *F01D 21/00* (2013.01); *F01D 25/24* (2013.01); *F01K 5/02* (2013.01);
(Continued)

(58) Field of Classification Search
CPC .......... F01D 25/12; F01D 21/00; F01D 25/24; F01K 5/02; F02C 7/12; F05D 2220/31; F05D 2260/232
(Continued)

(56) References Cited

U.S. PATENT DOCUMENTS 1,359,902 A    11/1920 Ljungstroem
4,013,877 A *   3/1977 Uram ..................... F01D 17/24
                                                    290/2
(Continued)

FOREIGN PATENT DOCUMENTS

DE         359 977 C       9/1922
GB       1 465 404 A       2/1977
(Continued)

OTHER PUBLICATIONS

European Search Report dated Mar. 23, 2015 (six pages).
Japanese Office Action issued in counterpart Japanese Application No. 2013-230192 dated May 30, 2017 (four pages).

*Primary Examiner* — Hoang Nguyen
(74) *Attorney, Agent, or Firm* — Crowell & Moring LLP

(57) ABSTRACT

The invention offers a steam turbine forced air cooling system, its method, and a steam turbine provided with the system, the system being of an inexpensive and simple device configuration and improving a cooling effect by the use of an easy-to-get device.
Suction is applied to the steam introduction side of an HP turbine 4 or an IP turbine 9 by the use of cooling air suction ejectors 27, 28 which use a compressed medium other than steam as a drive source. The cooling air is then introduced from the steam exhaust portion of the steam turbine into the inside of the steam turbine and is discharged from the ejectors 27, 28 to the atmosphere.

6 Claims, 6 Drawing Sheets

(51) Int. Cl.
    *F01D 21/00*     (2006.01)
    *F01D 25/24*     (2006.01)
    *F02C 7/12*     (2006.01)

(52) U.S. Cl.
    CPC ............ *F02C 7/12* (2013.01); *F05D 2220/31* (2013.01); *F05D 2260/232* (2013.01)

(58) Field of Classification Search
    USPC .................. 60/646, 657, 653–654, 677–680; 415/116
    See application file for complete search history.

(56) References Cited

U.S. PATENT DOCUMENTS

| | | | |
|---|---|---|---|
| 5,388,960 A * | 2/1995 | Suzuki .................... | F01D 25/26 415/108 |
| 6,145,317 A * | 11/2000 | Gobrecht ............. | F01K 13/025 415/116 |
| 2008/0006395 A1 * | 1/2008 | Sanderlin ................. | F28B 1/02 165/110 |

FOREIGN PATENT DOCUMENTS

| | | |
|---|---|---|
| JP | 46-2282 | 1/1971 |
| JP | 55-169537 | 12/1980 |
| JP | 56-32014 A | 4/1981 |
| JP | 58-220907 A | 12/1983 |
| JP | 3-4723 B2 | 1/1991 |
| JP | 5-106406 A | 4/1993 |
| JP | 9-125227 A | 5/1997 |
| JP | 9-183036 A | 7/1997 |
| JP | 2001-500943 A | 1/2001 |

* cited by examiner

STEAM TURBINE FORCED AIR COOLING SYSTEM, EQUIPMENT, AND STEAM TURBINE EQUIPPED WITH IT

BACKGROUND OF THE INVENTION

1. Field of the Invention

The present invention relates to a steam turbine forced air cooling system for forcibly cooling a steam turbine after the shutdown of the steam turbine, a steam turbine provided with the system, and a method of the steam turbine forced air cooling.

2. Description of the Related Art

A steam turbine introduces high-temperature steam of 500 degrees Celsius or higher at a steam turbine inlet portion. Such a steam turbine requires disassembly operation at the time of routine inspection or failure of the turbine itself. It would take a considerable period of time if the steam turbine is cooled through natural heat-release to a temperature at which turning can be stopped. In addition, electric power cannot be supplied in such a period of time. It is hence desirable to shorten a cooling-down period as much as possible with the stable supply and economic efficiency of electric power taken into consideration.

JP-1991-4723-B describes the following technology as a method of cooling steam turbine. The vacuum pump connected to the condenser is driven to apply suction power to the exhaust passage. The outside air is then sucked into the condenser from the vacuum breaker. This outside air passes through the LP turbine from the condenser and enters the inside of the IP turbine from the steam exhaust portion of the IP turbine. The outside air cools the IP turbine from the low temperature side thereof to increase in temperature. The outside air with increased temperature flows toward the high temperature side of the IP turbine to cool the high temperature side thereof and is discharged into the exhaust passage from the steam introduction portion of the IP turbine. Meanwhile, the outside air sucked into the condenser passes through the ventilator valve and the cold reheat pipe, enters the HP turbine from the steam exhaust portion thereof to cool the HP turbine, and is discharged into the exhaust passage from the steam introduction portion. JP-1991-4723-B describes the technology in which the ejector in place of the vacuum pump is connected to the condenser.

SUMMARY OF THE INVENTION

The steam turbine has been recently required to reduce the cooling time thereof after its shutdown in order to perform operation as quickly as possible also in a period of time from trial operation to the start of the operation of a power plant in addition to the time of routine inspection or of its failure. Therefore, the steam turbine is cooled with the use of the outside air so as not to cause heat stress or thermal strain. However, the above technology has a problem as below.

The technology described in JP-1991-4723-B uses the existing vacuum pump which evacuates the condenser. Since the cooling air is sucked by the existing vacuum pump, the amount of cooling air introduced into the steam turbine is limited by the capacity and suction capability of the vacuum pump. Thus, it used to be difficult to improve the cooling capability by increasing the amount of cooling air.

The air that has cooled the steam turbine has a high temperature and hence exceeds the operation temperature of the vacuum pump during normal operation. It is necessary to cool air by the use of an air cooler before the air will be introduced into the vacuum pump. Thus, there is a problem in that the delivery interval of the air cooler per se and the installation process to connect the air cooler with a closed cooling water pipe for supplying cooling water increase, which results in more time-consuming until the installation of the air cooler. Further, the higher cost being accompanied with the air cooler and its installation as well as the installation space of it will be necessary.

When ejectors are connected to the condenser in the above technology of JP-1991-4723-B, an ejector for start-up, another ejector for normal operation, and another ejector composed of a heat exchanger (hereinafter, referred to as the condenser-permanently-installed ejector) are used.

The type of the ejector for start-up and the ejector for normal operation installed in the condenser-permanently-installed ejector is a steam ejector which uses auxiliary steam as drive fluid.

In the condenser-permanently-installed ejector, the ejector for start-up having a large capacity is used to evacuate the condenser in order to discharge a large amount of air inside the condenser at the time of starting up the plant. In this case, since a boiler is not being operated, it is necessary to use an auxiliary boiler or another unit as an auxiliary steam source. In addition, since the boiler is not operated, it makes no sense to recover heat to steam condensate. Thus, exhaust air from the ejector for start-up is released to the atmosphere.

The amount of exhaust air during the normal operation of the plant is not greater than that at the time of start-up. Therefore, the plant is operated while maintaining the vacuum of the condenser using the ejector for normal operation. The auxiliary steam source for the ejector for normal operation is extracted from the inside of a cycle. Exhaust air from the ejector for normal operation is heat-recovered to steam condensate by the use of a heat exchanger additionally installed in the ejector.

The reasons why the condenser-permanently-installed ejector is of a steam type are as follows: the use of the existing high-pressure steam in the steam cycle is more efficient than the generation of compressed air by the compressor; the thermal energy of steam can be heat-recovered to steam condensate; and the capacity of the compressor cannot avoid being big when the ejector driven on compressed air is taken into consideration.

However, if the condenser-permanently-installed ejector is used for forced air cooling, there are problems as below.

For example, if the ejector for start-up is used for forced air cooling, high-temperature steam (roughly corresponding to auxiliary steam) that drives the ejector and is discharged is released to the atmosphere. Therefore, a large amount of thermal energy will be wasted.

If the ejector for normal operation is used, the high-temperature steam (roughly corresponding to auxiliary steam) discharged from the ejector is introduced into the heat exchanger. Therefore, it is necessary to allow condensate on the cooling side to flow into the heat exchanger in order to protect the heat exchanger. In other words, a condensate extraction pump at a standstill has to be started up only for forced air cooling. Additionally, even if the condensate extraction pump is started up and the high-temperature steam and condensate steam are subjected to heat exchange, thermal energy will not be effectively used because the boiler is under suspension. Thus, the result will end up being the same as wasting the thermal energy.

As described above, to make use of the condenser-permanently-installed ejector for forced air cooling, such an ejector has to be used after auxiliary steam is separately prepared as drive fluid. Therefore, although being steam of high temperature and having a large amount of thermal energy, the exhaust air from the ejector has to be thrown to the atmosphere. Even if exhaust air is heat-recovered to steam condensate, the result will end up being the same as wasting the thermal energy because the boiler is under suspension.

The forced air cooling is adapted to reduce the shutdown period of the plant to produce an economic effect. If the condenser-permanently-installed ejector is used, fuel is wastefully used; that is, thermal energy is wasted, thereby eliminating an economic effect. Thus, there is a problem in that the forced air cooling does not sufficiently contribute to the stable supply of electric power.

It is an object of the present invention to offer a steam turbine forced air cooling system, its method, and a steam turbine provided with the system, the system being of an inexpensive and simple device configuration and improving a cooling effect by the use of an easy-to-get device.

According to one aspect of the present invention, there is provided a steam turbine forced air cooling system for forcibly cooling a steam turbine after the shutdown of the steam turbine, the system including: a branch pipe branched off from a pipe on the steam inlet side configured to supply steam to the steam turbine; a non-steam-driven ejector disposed on the branch pipe; and a stop valve disposed in the branch pipe at a position closer to the pipe on the steam inlet side than the pipe on the steam inlet side. The non-steam-driven ejector is a device that is installed separately from an existing vacuum pump (or a steam-driven ejector).

The present invention can improve a cooling effect by the use of a device that is easy to get when the steam turbine is tried to be forcibly cooled, the device being of an inexpensive and simple device configuration.

DESCRIPTION OF THE PREFERRED EMBODIMENTS

Preferred embodiments of a steam turbine forced air cooling system, its method, and a steam turbine provided with the system will hereinafter be described with reference to the figures.

First Embodiment

A first embodiment of a steam turbine forced air cooling system, its method, and a steam turbine provided with the system will be described with reference to FIGS. 1 and 2. The present embodiment describes a case where the present invention is applied to a steam turbine including a HP turbine, an IH turbine, and a LP turbine as an example in FIGS. 1 and 2.

Figure 1:
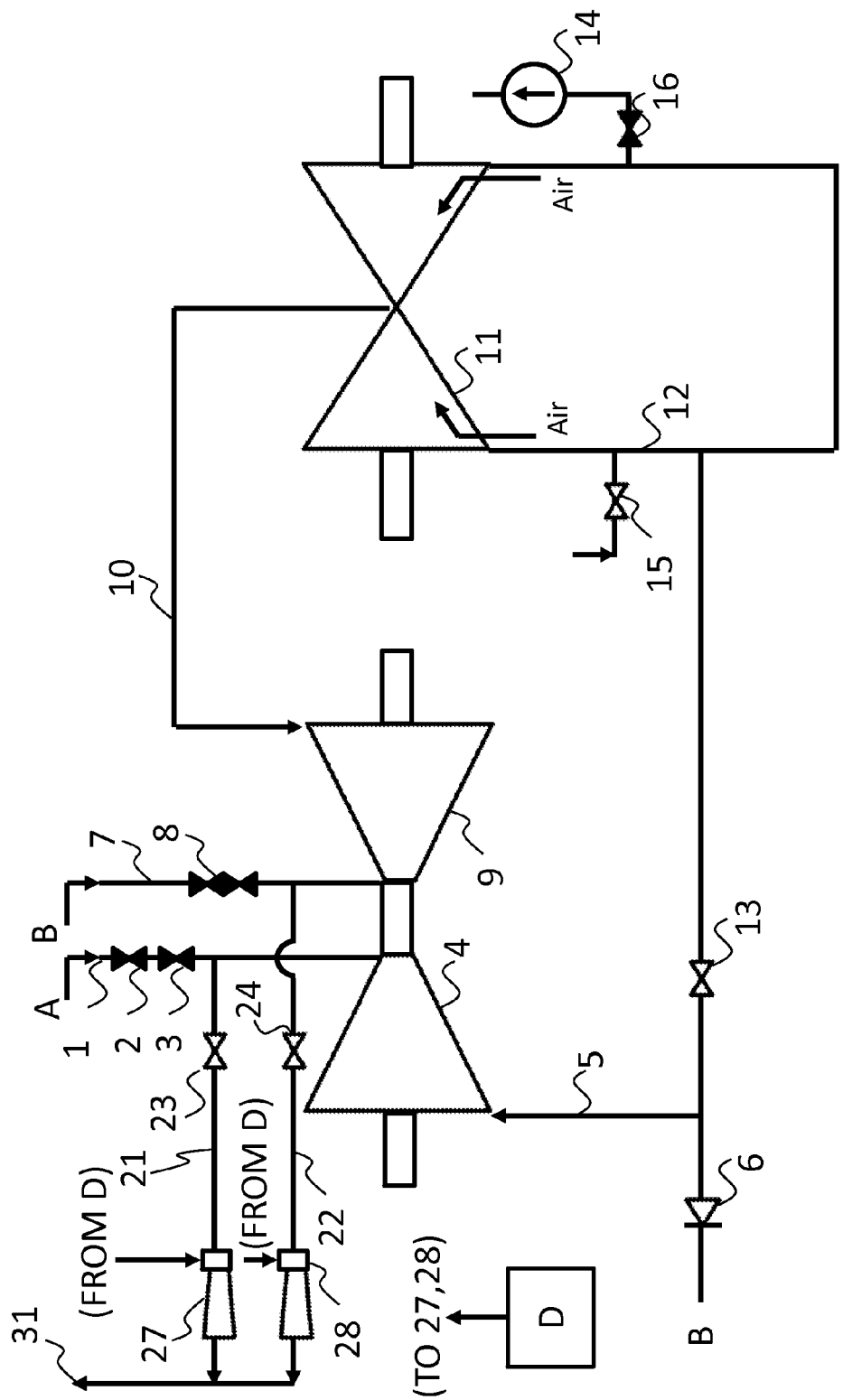
FIG. 1 illustrates a rough schema of a system of a steam turbine provided with a steam turbine forced air cooling system according to a first embodiment of the present invention.

FIG. 1 illustrates a rough schema of a system of the steam turbine provided with the steam turbine forced air cooling system according to the first embodiment of the present invention. FIG. 2 is a graph illustrating a relation between steam turbine metal temperature and an amount of cooling air according to the first embodiment of the present invention.

As illustrated in FIG. 1, the steam turbine includes several types of turbines associated with pressure, such as a HP turbine 4, an IP turbine 9, and a LP turbine 11.

In the steam turbine as described above, steam generated in a boiler A is introduced via a main steam pipe 1, a main steam stop valve 2, and a governing valve 3 into a HP turbine 4 before starting functioning. The exhaust air of the HP turbine 4 passes through a cold reheat pipe 5, is reheated in a repeater B, and is introduced via a hot reheat pipe 7 and a combined reheat valve 8 into an IP turbine 9 before starting functioning. Further, the exhaust air of the IP turbine is introduced via a crossover pipe 10 into the LP turbine 11 where it operates and is recovered into a condenser 12.

The steam turbine forced air cooling system of the present embodiment will now be described with reference to FIG. 1.

With reference to FIG. 1, the steam turbine forced air cooling system includes a branch pipe 21 branched off from the main steam pipe 1 at a position between the governing valve 3 and the steam introduction portion of the HP turbine 4; a branch pipe 22 branched off from the hot reheat pipe 7 at a position between the combined reheat valve 8 and the steam introduction portion of the IP turbine 9; stop valves (for stopping the flow of steam) 23, 24 respectively installed in the branch pipes 21, 22; ejectors 27, 28 respectively installed in the branch pipes 21, 22; and an exhaust pipe 31 adapted to discharge the gas discharged from the ejectors 27, 28.

The ejectors 27, 28 are non-steam-driven ejectors which use a compressed medium other than steam as a drive source. The present embodiment uses an ejector that uses compressed air from the compressor D for drive. Incidentally, the ejectors include a gas-driven ejector, the gas including nitrogen, and a water-driven ejector in addition to an air-driven ejector.

The compressed air supply source is not limited to the compressor D but service air, a cylinder or the like can be used.

The ejectors 27, 28 are adjusted by adjusting suction power to increase or decrease an amount of cooling air in accordance with a difference between metal temperature and air temperatures in the steam turbine. Incidentally, an amount of air according to cooling speed is adjusted by any of the methods such as adjustment of openings of valves installed in cooling air passages, adjustment by means of the pressure of air used to drive the ejector, and adjustment by the additional provision of an ejector in the middle of cooling.

A description will be next given of a method of steam turbine forced air cooling by use of a steam turbine forced air cooling system as described above.

The steam turbine is cooled at the time of routine inspection or of the failure of the steam turbine itself, or in a period of time from the trial operation to start of operation of a power plant. In such a case, the main stop valve 2, the combined reheat valve 8, and a vacuum pump inlet valve 16 disposed on a steam inlet side of a vacuum pump 14 are fully closed. On the contrary, the stop valves 23, 24 and a ventilator valve 13 which are additionally provided as the cooling system are fully opened. In addition, a vacuum breaker 15 is fully opened to allow the condenser 12 to be released to the atmosphere.

Thereafter, compressed air is introduced into the ejectors 27, 28 from the compressor D to drive the ejectors 27, 28, respectively, which apply suction to the steam introduction portion of the HP turbine 4 or the IP turbine 9. That is to say, suction power for the gas in the HP turbine 4 or the IP turbine 9 is generated.

Then, the suction power thus generated allows cooling air to flow from the vacuum breaker 15 into the condenser 12. The air flowing into the condenser 12 flows into the exhaust portion of the LP turbine 11, passing through the LP turbine 11 while cooling it, and flows into the exhaust portion of the IP turbine 9 via the crossover pipe 10. In this way, the air flowing into the IP turbine 9 cools the IP turbine 9. The air that has cooled the IP turbine 9 flows in the branch pipe 22 and is discharged to the atmosphere via the ejector 28 and the exhaust pipe 31.

Meanwhile, the air flowing into the condenser 12 also flows via the ventilator valve 13 into the exhaust portion of the HP turbine 4 to cool the HP turbine 4. The air having cooled the HP turbine 4 flows into the branch pipe 21 and is discharged to the atmosphere via the ejector 27 and the exhaust pipe 31.

As described above, in the first embodiment of the steam turbine forced air cooling system, its method, and a steam turbine provided with the system according to the present invention, the cooling air suction ejectors 27, 28 by use of the compressed medium other than steam as the drive source apply suction to the steam introduction side of the HP turbine 4 or the IP turbine to introduce cooling air from the steam exhaust portion of the steam turbine into the turbine and discharge the cooling air from the ejectors 27, 28 to the atmosphere. In this way, the air sucked by the non-steam-driven ejectors first cools the steam exhaust portion of the steam turbine first, and the higher-temperature air then cools the high pressure side steam introduction portion. Accordingly, the steam turbine is uniformly cooled; that is, it does not cause heat stress or thermal strain. Thus, the steam turbine can be cooled efficiently.

A conventional steam turbine forced air cooling system sucks air by use of an existing vacuum pump which produces a vacuum in a condenser, allows the outside air to flow from a condenser vacuum breaker to the steam introducing portion of the steam turbine to cool the steam turbine. In this system, cooling air is sucked by the existing vacuum pump; therefore, the amount of cooling air introduced into the steam turbine is limited by the capacity and suction capability of the vacuum pump. Thus, it was hard to improve the cooling capability with the use of an increased amount of cooling air.

Figure 2:
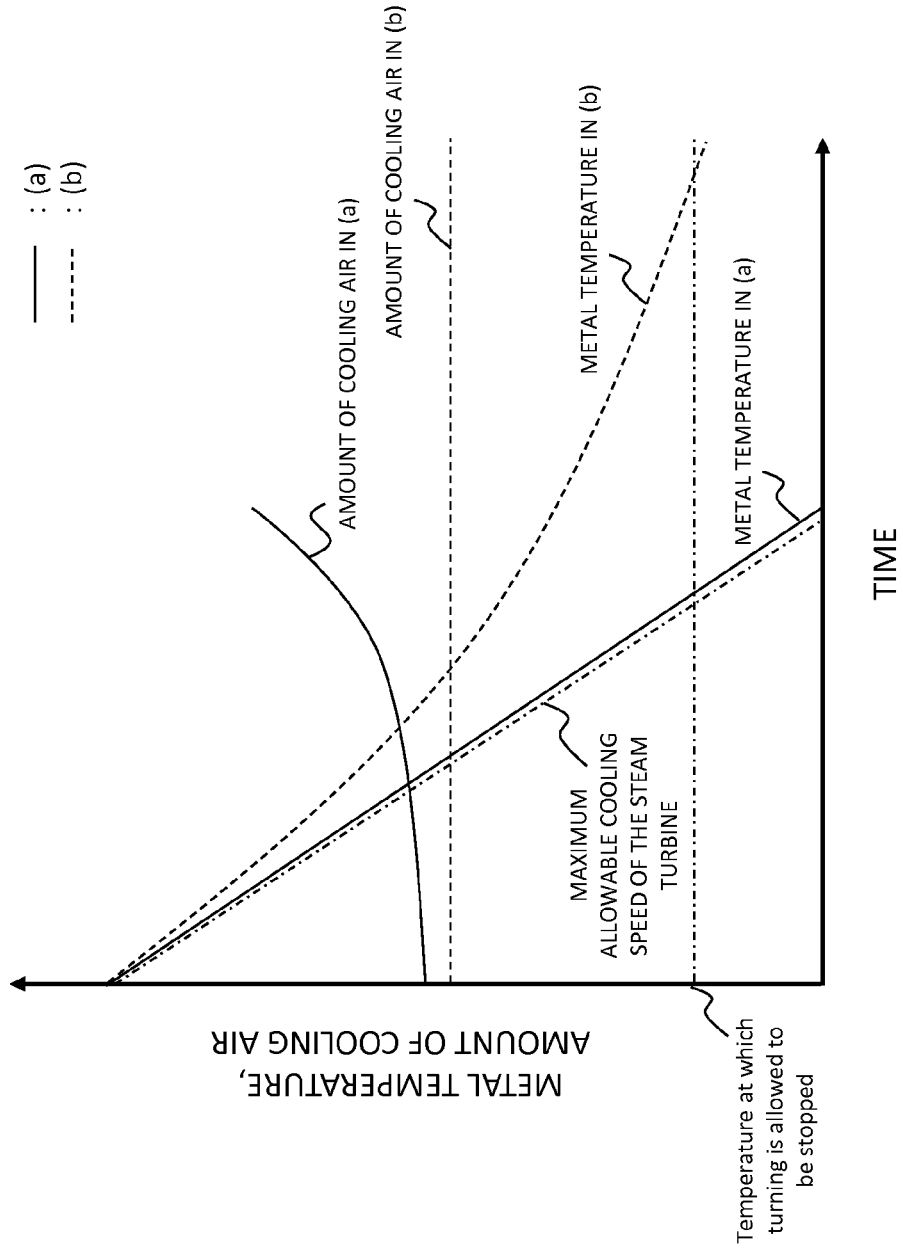
FIG. 2 shows a relation between steam turbine metal temperature and an amount of cooling air according to the first embodiment of the present invention.

For example, when a vacuum pump as shown with (b) in FIG. 2 is used, if the metal temperature of the steam turbine drops to approximately 250° C., a temperature difference with respect to cooling air turns out to be smaller to make the cooling speed slower.

However, the present embodiment uses the cooling air suction ejectors installed separately from the existing vacuum pump (or the steam-driven ejector). The amount of cooling air of the ejectors is thus not limited by the capacity and suction power of the existing vacuum pump. An improvement in the capacity and suction power of the cooling air suction ejector enables it to achieve an increase in the amount of cooling air. Accordingly, the steam turbine can be cooled at the maximum allowable cooling speed.

For example, the steam turbine can constantly be cooled at speed close to the maximum allowable cooling speed as shown in (a) in FIG. 2.

Further, because of the use of the non-steam-driven ejectors, the fuel will not be wastefully used; that is, thermal energy which could eliminate an economic effect will not be wasted, such a problem being posed by the use of a condenser-permanently-installed ejector. Thus, an economic effect produced by the steam turbine forced air cooling shortening the period of the shutdown of a plant can be exhibited at a maximum. In addition, the use of the non-steam-driven ejectors can contribute to the stable supply of electric power.

The steam turbine immediately after shutdown has a high temperature exceeding 500° C.; however, the air discharged from it has a temperature of approximately 200 to 300° C. If cooling is sucked by means of an existing vacuum pump, therefore, an air cooler will be needed before introducing into the vacuum pump the high-temperature air that has cooled the steam turbine. However, since the non-steam-driven ejector can sufficiently be used even if it is of an aluminum-made general-purpose product, the air cooler is of no need.

Since the vacuum pump for the condenser is not used, there is an advantage that even if the ejector gets out of order, the normal operation of the steam turbine will not be affected by that.

In this way, the connection with the air cooler and with a closed cooling water system for supplying cooling water is unnecessary. Therefore, the delivery interval and installation process of devices and the cost arising from these procedures can be reduced. In addition, since the non-steam-driven ejector weighs only approximately several kilograms, it can easily be removed at the time of the normal operation of the steam turbine. Further, a large space for its installation is not necessary.

Second Embodiment

A second embodiment of a steam turbine forced air cooling system, its method, and a steam turbine provided with the system will be described with reference to FIGS. 3 and 4.

Figure 3:
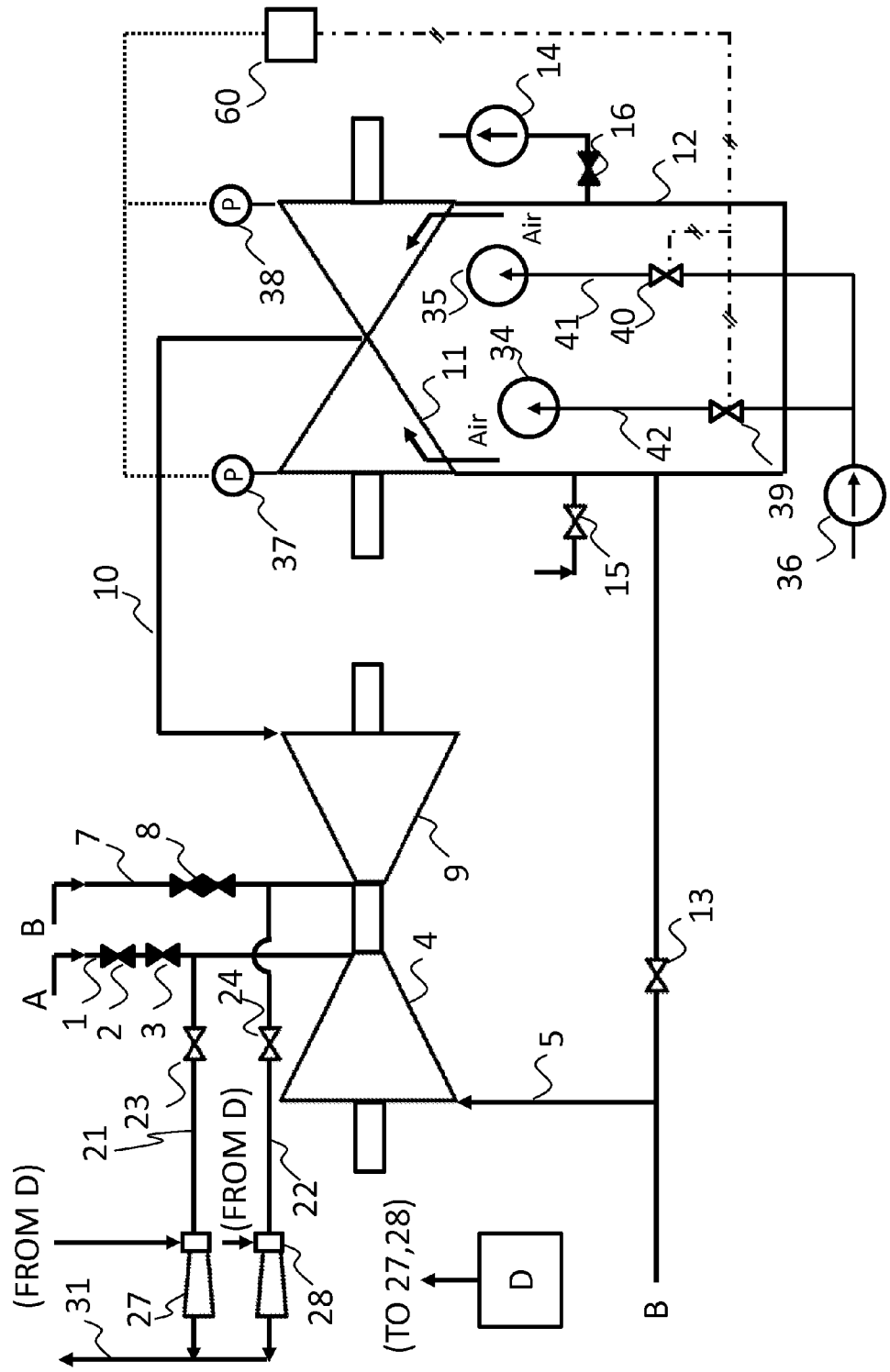
FIG. 3 illustrates a rough schema of a system of a steam turbine provided with a steam turbine forced air cooling system according to a second embodiment of the present invention.

FIG. 3 illustrates a rough schema of a system of a steam turbine provided with a steam turbine forced air cooling system according to a second embodiment of the present invention. FIG. 4 is a graph illustrating pressures at various portions of the steam turbine according to the second embodiment of the present invention.

With reference to FIG. 3, the steam turbine forced air cooling system of the present embodiment is such that seats, e.g., manhole seats 34, 35 for maintenance installed on the condenser 12; branch pipes 41 and 42 respectively branched off from the manhole seats 34 and 35; valves 39 and 40 respectively installed in the branch pipes 41 and 42; a blower 36 installed on the branch pipes 41, 42; pressure detectors 37, 38 installed close to an atmospheric relief diaphragm installation portion not shown; and a controller 60 are further attached to the steam turbine forced air cooling system of the first embodiment.

The blower 36 is adapted to feed the compressed air of the compressor, service air or the combination of such air into the steam turbine via the condenser 12.

The controller 60 controls the opening degrees of the valves 39, 40 on the basis of the pressure, detected by the pressure detectors 37, 38, in the vicinity of the atmosphere relief diaphragm installation portion of the LP turbine 11 so that the pressure in the vicinity of the atmosphere relief diaphragm installation portion of the LP turbine 11 may not exceed a working pressure of the atmospheric relief diaphragm, i.e., approximately 30 to 40 kPa.

The configurations other than this are almost the same as those of the steam turbine forced air cooling system of the first embodiment and hence their details are omitted.

To cool the steam turbine in the present embodiment, the valves 39, 40 are opened and the blower 36 delivers cooling air into the steam turbine in addition to the ejectors 27, 28 sucking the cooling air.

The second embodiment of the steam turbine forced air cooling system, its method, and a steam turbine provided with the system of the present invention produces almost the same advantages as those of the first embodiment of the steam turbine forced air cooling system, its method, and a steam turbine provided with the system described earlier.

Figure 4:
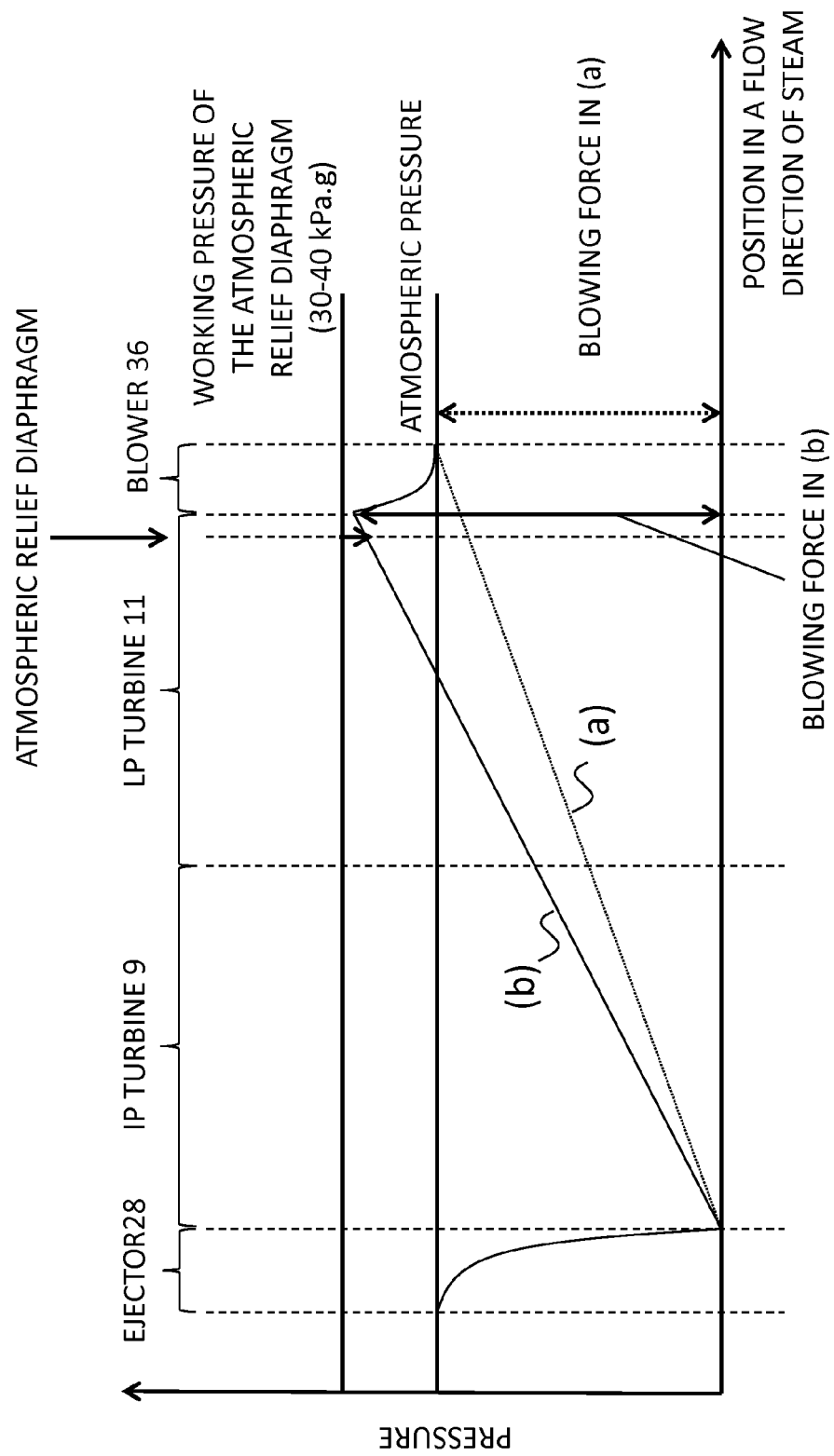
FIG. 4 shows the relation between steam turbine metal temperature and an amount of cooling air according to the second embodiment.

In the first embodiment, the cooling air is introduced only by means of the suction power of the ejectors 27, 28 as shown with (a) of FIG. 4. Therefore, the pressure at the exhaust port side of the LP turbine 11 rises up to the atmospheric pressure. The pressure difference between the atmospheric pressure and pressure at the high pressure side (the combined reheat valve 8 side) of the IP turbine 11, i.e., the blowing force of the cooling air, corresponds to [(the atmospheric pressure)−(the reachable pressure of the ejector 28)].

Meanwhile, in the present embodiment, the press force of the blower 36 is added to the suction power of the ejectors 27, 28. Therefore, as shown with (b) of FIG. 4, pressure at the exhaust port side of the LP turbine 11 can be raised up to the pressure near the operation pressure of the atmospheric relief diaphragm. The blowing force of the cooling air becomes a pressure equal to [(atmospheric pressure)+(an increase in pressure by the blower 36)−(reachable pressure by the ejector 28)]. The blowing force improves compared with that of the first embodiment. And the amount of cooling air passing through the steam turbine can be increased. Thus, the steam turbine can forcibly be cooled in a shorter period of time.

The present embodiment exemplifies the case where the capacity and press force of the blower 36 are selected by the controller 60 using the signals from the pressure detectors 37, 38. If the air is delivered from the exhaust portion of the LP turbine 11, such as the seats disposed on the condenser 12, there is concern regarding the breakage of the atmospheric relief diaphragm installed in the exhaust chamber of the LP turbine 11. However, it is not necessary in some cases to consider the working pressure of the atmospheric relief diaphragm because of the relation among the diameter of the crossover pipe, the capacities of the condenser 12 and the exhaust chamber of the LH turbine 11, and the capacity of the blower 36. Such a case does not need the controller 60 to be used.

The portions to which the air is introduced by the blower are not limited to the manhole seats 34, 35 for maintenance of the condenser 12. The air may be introduced from the casing of the LP turbine or the crossover pipe mentioned above.

Third Embodiment

A third embodiment of a steam turbine forced air cooling system, its method, and a steam turbine provided with the system will be described with reference to FIG. 5.

Figure 5:
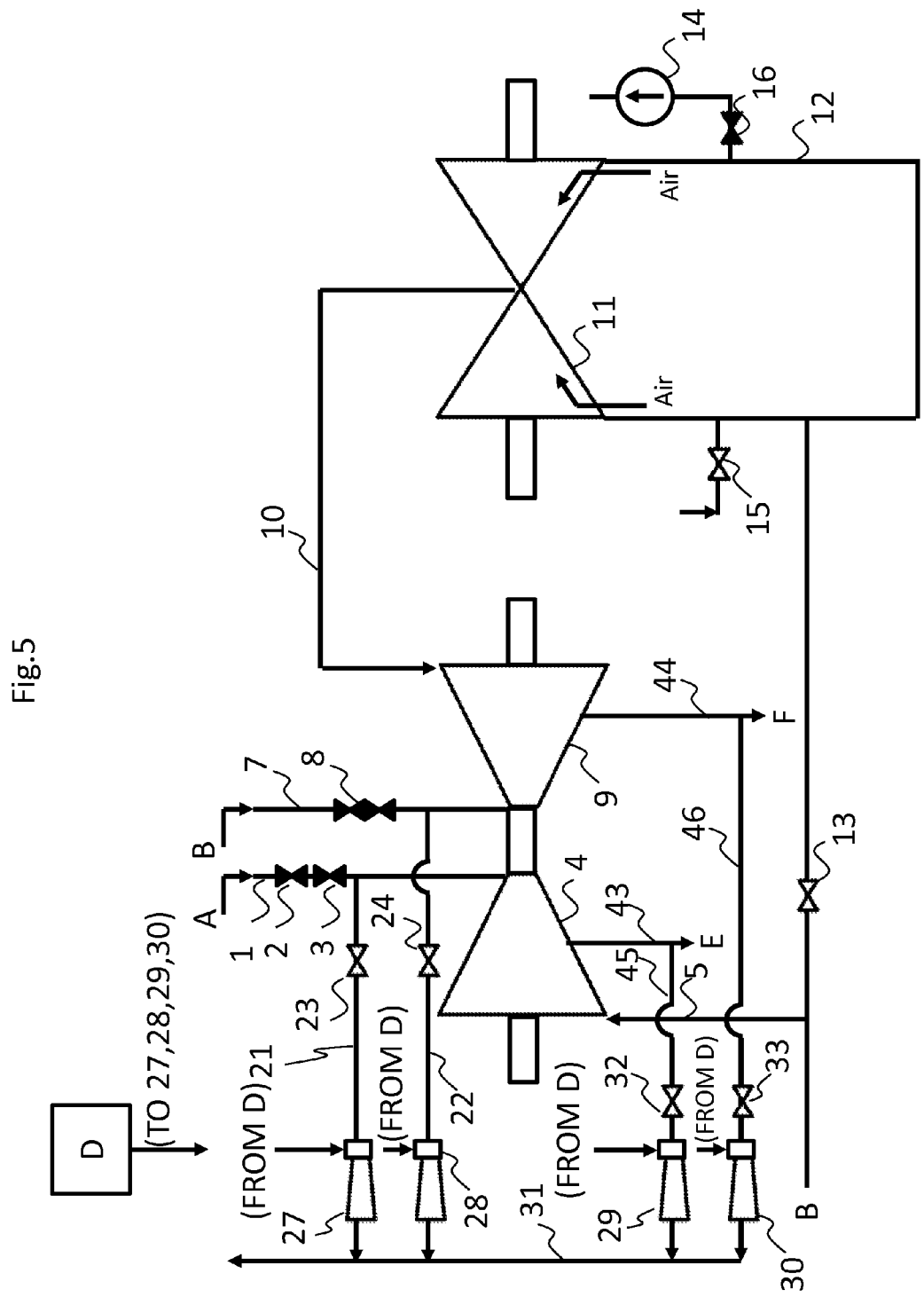
FIG. 5 illustrates a rough schema of a system of a steam turbine provided with a steam turbine forced air cooling system according to a third embodiment of the present invention.

FIG. 5 illustrates an outline of the system of a steam turbine provided with a steam turbine forced air cooling system according to a third embodiment of the present invention.

With reference to FIG. 5, the steam turbine forced air cooling system of the present embodiment is such that a branch pipe 45 branched off from an extraction pipe 43 disposed on the HP turbine 4, a branch pipe 46 branched off from an extraction pipe 44 disposed on the IP turbine 9, and stop valves 32, 33 and ejectors 29, 30 installed on the corresponding branch pipes 45, 46 are further attached to the steam turbine forced air cooling system of the first embodiment.

The configurations other than this are almost the same as those of the steam turbine forced air cooling system of the first embodiment and hence their details are omitted.

To cool the steam turbine in the present embodiment, the stop valves 32, 33 are fully opened and then compressed air is introduced from the compressor D into the ejectors 29, 30 to generate suction power, thereby introducing cooling air into the steam turbine, in addition to the cooling air sucking operation of the ejectors 27, 28.

The third embodiment of the steam turbine forced air cooling system, its method, and a steam turbine provided with the system of the present invention also produces almost the same advantages as those of the first embodiment of the steam turbine forced air cooling system, its method, and a steam turbine provided with the system described earlier.

In addition, the branch pipes 45, 46 and the ejectors 29, 30 are additionally attached to the corresponding extraction pipes 43, 44 to increase suction portions. The suction power of cooling air can be improved. Thus, the amount of cooling air that passes through the steam turbine can be improved.

In the present embodiment, the capacities of the extraction pipes on which the branch pipes are installed and the ejectors connected to the branch pipes 45, 46 are selected taking into consideration the speed of a turbine or turbines and the cooling speed inside the turbines. The cooling speed is improved and the number of cooling air passages is increased compared with those of the first embodiment. Thus, the entire steam turbine can uniformly be cooled.

Fourth Embodiment

A fourth embodiment of a steam turbine forced air cooling system, its method, and a steam turbine provided with the system will be described with reference to FIG. 6.

Figure 6:
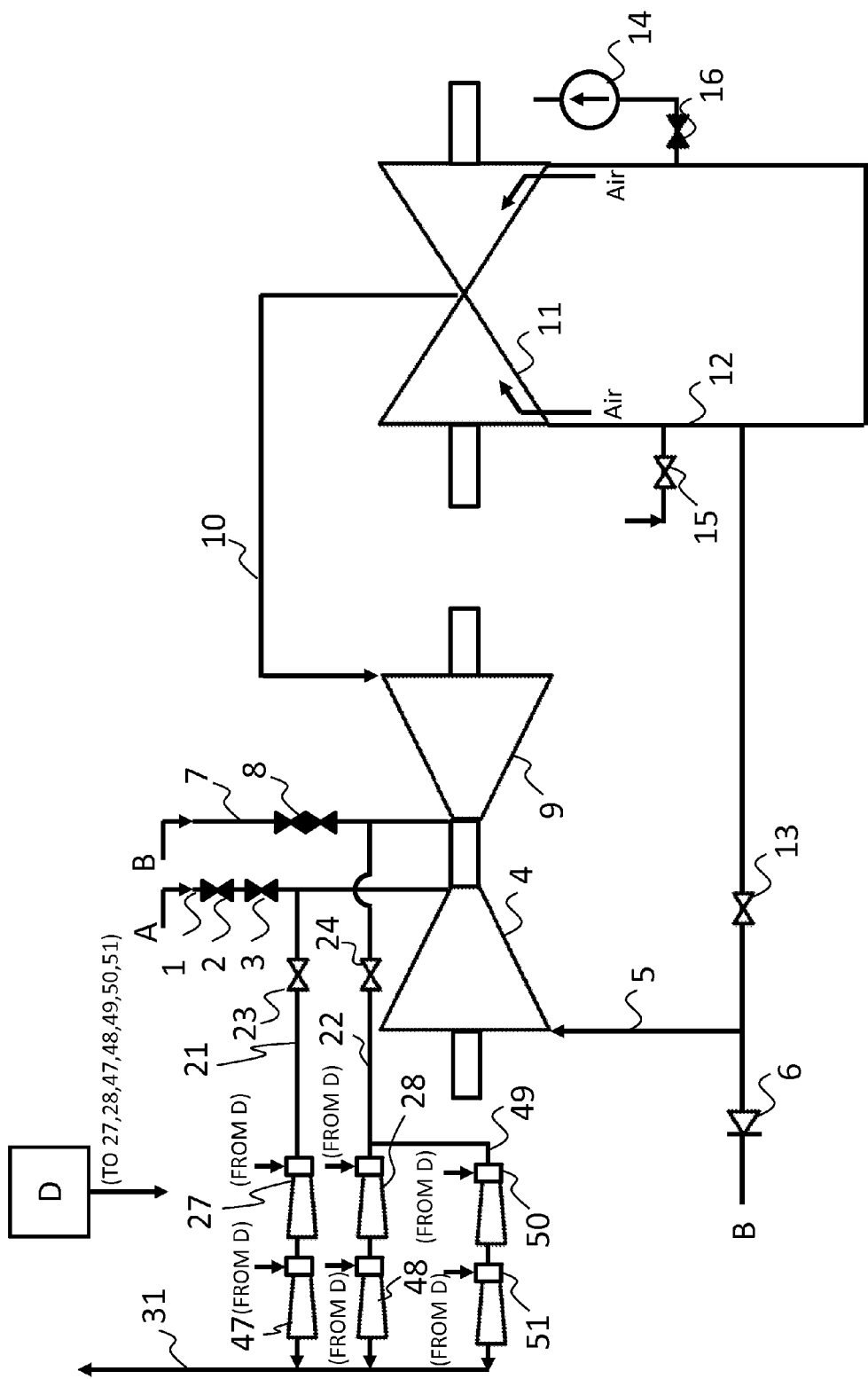
FIG. 6 illustrates a rough schema of a system of a steam turbine provided with a steam turbine forced air cooling system according to a fourth embodiment of the present invention.

FIG. 6 illustrates an outline of the system of a steam turbine forced air cooling system, a steam turbine provided with the system, and a steam turbine forced air cooling system according to a fourth embodiment of the present invention.

With reference to FIG. 6, the steam turbine forced air cooling system of the present embodiment is such that ejectors 47, 48 installed on the downstream side of the corresponding ejectors 27, 28 of the branch pipes 21, 22, a pipe 49 further branched off from the branch pipe 22, and ejectors 50, 51 installed on the branch pipe 49 are further attached to the steam turbine forced air cooling system of the present embodiment.

The configurations other than this are the same as those of the steam turbine forced air cooling system of the first embodiment and hence their details are omitted.

To cool the steam turbine in the present embodiment, the compressed air is also introduced from the compressor D into the ejectors 47, 48 and the ejectors 50, 51 to generate suction power, in addition to the cooling air sucking operation of the ejectors 27, 28. In this way, the cooling air is introduced into the steam turbine.

The fourth embodiment of the steam turbine forced air cooling system, its method, and a steam turbine provided with the system of the present invention also produces almost the same advantages as those of the first embodiment of the steam turbine forced air cooling system, its method, and a steam turbine provided with the system described earlier.

Additionally, since the total number of the ejectors has been increased, the suction power of the ejectors has bigger to make the amount of introduced cooling air larger. Thus, the cooling performance can further be improved.

The positions and the number of the additionally installed ejectors and the ejector arrangement method are not limited to those shown in FIG. 6. The positions and the number of the additionally installed ejectors and the ejector arrangement method are determined with the cooling speeds at portions inside the turbine or the turbines taken into consideration. In this way, the cooling speed is improved as much as possible, and at the same time, the entire steam turbine can uniformly be cooled.

For example, the ejectors are arranged in parallel to each other to increase the capacities of the ejectors whereas the ejectors are arranged in series to improve the suction power.

As described in the third embodiment, needless to say, a plurality of the ejectors also can be installed on the branch pipes 45, 46 extending from the corresponding extraction pipes 43, 44.

<Others>

The present invention is not limited to the above embodiments but can be modified or applicable in various ways. The above embodiments have been described in detail to explain the present invention comprehensively. The present invention is not always limited to the combination of all the configurations described above. The configurations of the above-described embodiments 1 to 4 can appropriately be combined.

For example, the above embodiments 1 to 4 describe the forced air cooling system of the single reheat turbine; however, the present invention is not limited to this. The steam turbine forced air cooling system and the method of the forced air cooling of the present invention also can be applied to steam turbines non reheat or double reheat steam turbines.

The steam turbine forced air cooling system, its method, and a steam turbine provided with the system may be applied to a steam turbine without the ventilator valve 13. In such a case, preferably, a branch pipe branched off from the cold reheat pipe 5 is provided, a stop valve is disposed in this branch pipe, and introduction of air is achieved by allowing the turbine to communicate with the atmosphere.

Further, the above embodiments 1 to 4 have been described with the use of the example of the steam turbine of a thermal plant. However, the present invention can be applied to a steam turbine of a C/C plant (a combined cycle plant) as well.

What is claimed is:

1. A steam turbine forced air cooling system for forcibly cooling a steam turbine after shutdown of the steam turbine, comprising:
    a first branch pipe branched off from a pipe on a steam inlet side configured to supply steam to the steam turbine;
    a non-steam-driven ejector disposed on the branch pipe; and
    a stop valve disposed in the branch pipe at a position closer to the pipe on the steam inlet side than to the non-steam-driven ejector, wherein
    the non-steam-driven ejector is installed separately from an existing vacuum pump or a steam-driven ejector,
    the existing vacuum pump or the steam-driven ejector is configured to produce a vacuum in a condenser,
    the first branch pipe does not connect the existing vacuum pump or the steam-driven ejector, and
    the non-steam-driven ejector releases an exhaust air to an atmosphere through the first branch pipe without passing through the existing vacuum pump or the steam-driven ejector.

2. A steam turbine forced air cooling system for forcibly cooling a steam turbine after shutdown of the steam turbine, comprising:
    a first branch pipe branched off from a pipe on a steam inlet side configured to supply steam to the steam turbine;
    a non-steam-driven ejector disposed on the branch pipe;
    a stop valve disposed in the branch pipe at a position closer to the pipe on the steam inlet side than to the non-steam-driven ejector;
    an opening portion; and
    a blower connected to the opening portion, wherein the opening portion and the blower are adapted to supply air from a steam turbine exhaust portion in such a range as not to damage an atmospheric relief diaphragm installed on an exhaust portion side of the steam turbine when the steam turbine is cooled after cooling air is sucked from a low pressure portion side of the steam turbine released to atmosphere through the non-steam-driven ejector toward a steam inlet side serving as a high pressure portion side.

3. The steam turbine forced air cooling system according to claim 1, further comprising:
    a pipe connected to an inside of the steam turbine, the pipe having therein a second branch pipe on which the non-steam-driven ejector is disposed.

4. The steam turbine forced air cooling system according to claim 1, further comprising:
    a plurality of the non-steam-driven ejectors.

5. A steam turbine system, comprising:
    a steam turbine configured to function by use of steam flowing from a steam inlet portion to a steam exhaust portion during normal operation; and
    the steam turbine forced air cooling system according to claim 1.

6. A method of forcibly cooling a steam turbine in which high-temperature and high-pressure steam flows from a high pressure portion through a low pressure portion of the turbine to a condenser, involving steps of,
    causing the steam turbine to shut down;
    then releasing a low pressure portion side of the steam turbine to the atmosphere; and
    introducing cooling air toward the steam inlet side from the low pressure portion side released to the atmosphere as a result of a non-steam-driven ejector sucking gas inside the steam turbine from a high pressure portion side of the steam turbine, wherein
    the non-steam-driven ejector is installed on a first branch pipe branched off from a pipe on the steam inlet side that is located on the high pressure portion side of the steam turbine,
    the non-steam-driven ejector is installed separately from an existing vacuum pump or a steam-driven ejector, the existing vacuum pump or the steam-driven ejector is configured to produce a vacuum in the condenser, the first branch pipe does not connect the existing vacuum pump or the steam-driven ejector, and the non-steam-driven ejector releases an exhaust air to an atmosphere through the first branch pipe without passing through the existing vacuum pump or the steam-driven ejector.

\* \* \* \* \*